Oct. 2, 1934.  E. A. ROCKWELL  1,975,478
INPUT LINKAGE CONTROL FOR POWER BRAKES
Filed Feb. 20, 1932  2 Sheets-Sheet 1
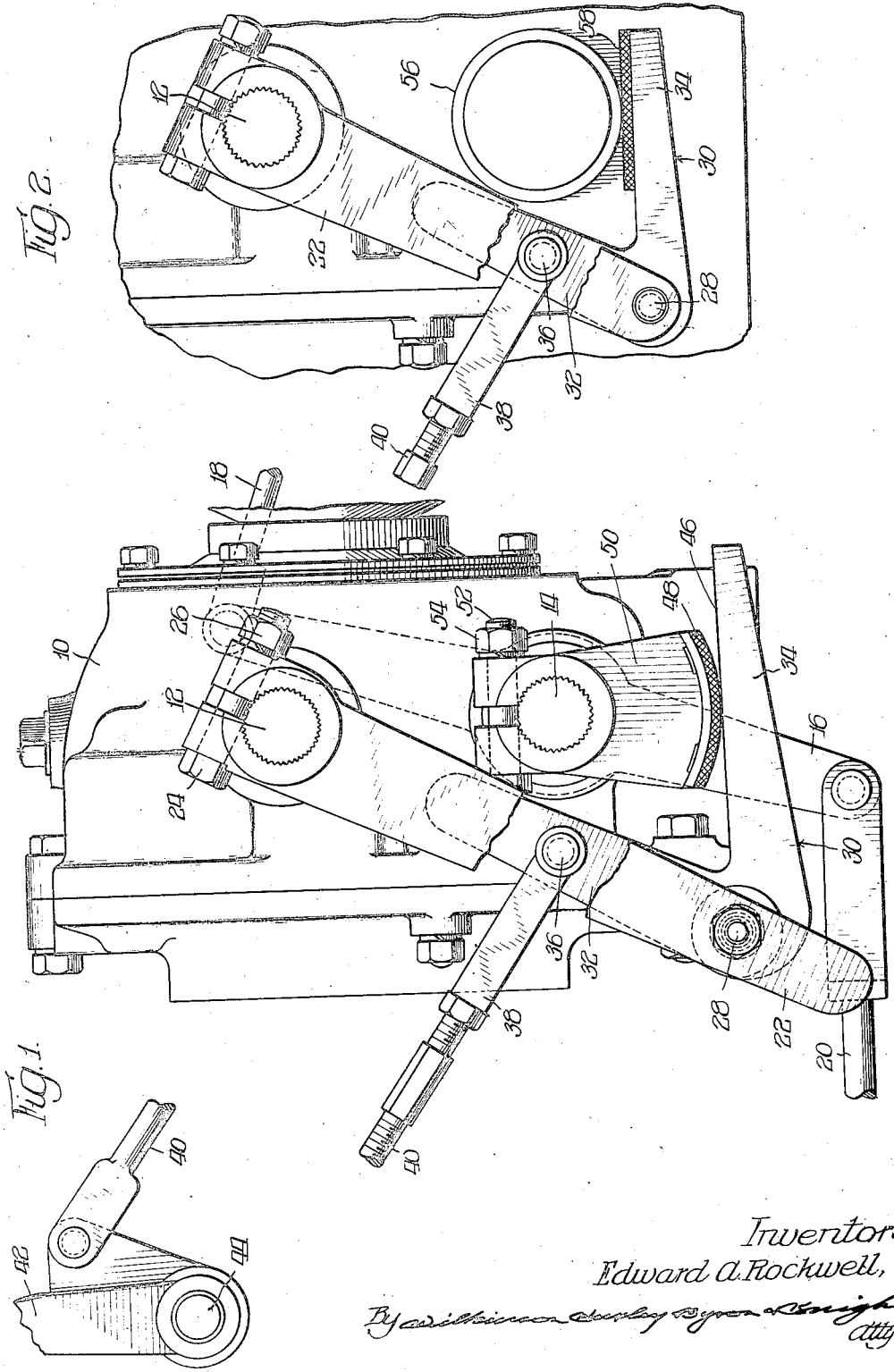
Inventor:
Edward A. Rockwell,

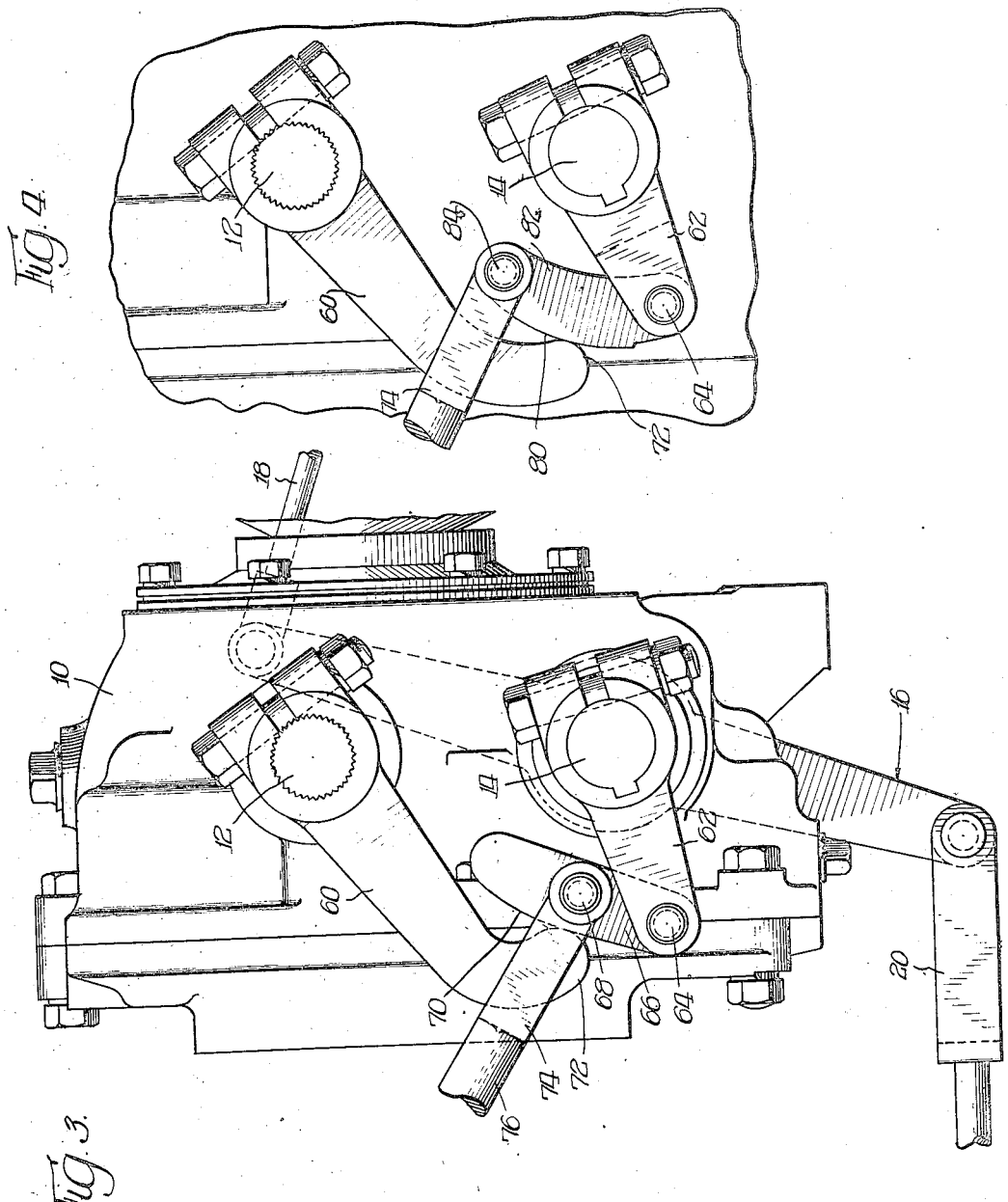

Patented Oct. 2, 1934

1,975,478

UNITED STATES PATENT OFFICE 1,975,478

INPUT LINKAGE CONTROL FOR POWER BRAKES

Edward A. Rockwell, Chicago, Ill.

Application February 20, 1932, Serial No. 594,221

7 Claims. (Cl. 188—140)

This invention relates to improvements in the input linkage control of a mechanical power brake such as used in the power brake system of a motor vehicle for actuating the four-wheel brakes.

I have disclosed in my application, Serial No. 516,888, filed February 19, 1931, a mechanical power brake unit with which the present improvements may be employed. The power brake unit includes input and output rock shafts and the input rock shaft is controlled from the usual brake pedal while the output rock shaft is connected to the brake linkage for actuating the four-wheel brakes. Since a power brake only requires a very light pedal pressure and a comparatively short pedal travel, it is desirable to employ some means for controlling the initial input to the power brake in order to obtain a smooth and even braking action.

It is an object of the present invention to provide means cooperating with the input linkage of the power brake to initially oppose the input movement and in some cases to decrease the input braking pressure and permit a longer pedal travel as the output of the power brake becomes effective to apply wheel brakes.

The particular features and advantages of the present improvements will be more readily apparent from the following description taken in connection with the attached drawings, in which—

Figure 1 is a partially broken side elevation of the power brake and input linkage;

Figure 2 is a partial side elevation showing a modified arrangement;

Figure 3 is a side elevation showing a still further modification, and

Figure 4 is a partial side elevation slightly modified from the arrangement disclosed in Figure 3.

In the arrangement disclosed in Figure 1, 10 is the power brake casing having mounted therein an input rock shaft 12 and an output rock shaft 14. The output rock shaft 14 is adapted to engage a double arm brake lever 16 on the rear side of casing 10, which is connected by brake rod 18 to the rear brakes and brake rod 20 to the front brakes. The input rock shaft 12 has secured thereto on the front side of the casing 10 an input lever arm 22 secured by bolt 24 and nut 26. The arm 22 carries a pivot pin 28 at its lower end which supports a bell crank lever 30 having an upwardly extending arm 32 and a laterally extending arm 34.

The arm 32 carries a pivot pin 36 connected by clevis 38 to the adjustable link connection 40 which transmits input movement from the pedal 42 carried by fixed pivot 44.

The top face 46 of lever arm 22 bears against the arcuate friction face 48 on a sector-shaped arm 50 secured by bolt 52 and nut 54 to the protruding end of the output rock shaft 14. It will be noted that in normal released position the pivot point 36 is substantially in line with input rock shaft 12 and the pivot point 28.

Application of foot pressure to the pedal 42 will tend to transmit tension through the adjustable link 40 and tend to rotate the bell crank lever 30 in a counter-clockwise direction about the pivot point 28 but this movement will be resisted due to the arm 34 of the bell crank lever bearing against the friction face 48 of the arm 50. Therefore a component of pressure will tend to move the pivot point 28 and lever 22 in a clockwise direction of rotation about the axis of input rock shaft 12 and the rock shaft 12 will therefore be moved in a direction to apply the power brake. During this movement the arm 34 of the bell crank lever will slide relative to the friction face 48 and the frictional resistance will oppose the input braking force. As soon as the power brake comes into action the output rock shaft 14 will begin to move in a counter-clockwise direction of rotation and the arm 50 will move with the output rock shaft 14 in such a manner that relative movement will occur between the friction face 48 and the lever arm 34. This action will tend to further oppose the input braking force developed by the pressure upon the foot pedal and the lever arm 22 will tend to move in a releasing direction. However, by continued application of pedal pressure the operator will obtain a smooth and even application of the wheel brakes.

A similar modified arrangement is illustrated in Figure 2 in which the input rock shaft 12 has secured thereto an input lever arm 22 carrying a pivot 28 supporting a bell crank lever 30 having an upwardly extending arm 32 and a lateral arm 34. The arm 32 carries a pivot 36 connected by clevis 38 to adjustable link 40. The power brake casing 10 however has integrally formed therewith a cylindrical boss 56 concentric with the axis of the output rock shaft and the lever arm 34 has a friction face 58 bearing against the cylindrical surface of the boss 56. In this arrangement the input movement transmitted through link 40 to the pivot point 36 will develop a component of pressure tending to rotate the bell crank lever 30 in a counter-clockwise direction which is opposed by the arm 34 bearing against the boss 56. The pivot point 28 and arm 22 will therefore move in a clockwise direction to move the input rock shaft 12 in an actuating direction and this action will be opposed by the sliding of the friction face 48 with respect to the boss 56.

In Figure 3 the power brake casing 10 has an input rock shaft 12, an output rock shaft 14, double arm brake applying lever 16, a front pull rod 20 and a rear pull rod 18. The input rock shaft has secured thereto an input lever arm 60. The output rock shaft 14 has secured thereto an arm 62. The arm 62 carries a pivot pin 64 for a thrust link 66 which has a pivot pin 68 between its ends and is formed with a cam face 70 from which pressure is transmitted to the circular-shaped end 72 of the input lever arm 60. The end 72 is received within a clevis 74 which forms a connection for the pedal-controlled link 76.

Upon the initial transmission of the braking force through the input link 76 the thrust link 66 will tend to rotate in a counter-clockwise direction about the pivot 64 which will remain stationary until the output rock shaft 14 is moved. Therefore a component of pressure will be transmitted through the input lever arm 60 and the rock shaft 12 will be moved in a direction to apply the power brake. The movement of the output rock shaft 14 in a counter-clockwise direction for applying the wheel brakes will move the arm 62 and the pivot 64 in a manner to slide the thrust link 66 relative to the lever arm 60 and due to the contour of the cam surface 70, the input braking pressure will be reduced. It will be further noted that as the end 72 of lever arm 60 slides towards the upper end of the link 66 the leverage will be reduced requiring a greater application of foot pressure upon the pedal to maintain the application of the wheel brakes by the operation of the power brake. Therefore with this arrangement a smooth and even braking action is obtained.

A somewhat similar arrangement is illustrated in Figure 4. The input rock shaft 12 has secured thereto an input lever arm 60 formed with a curved end 72 bearing against the cam surface 80 of a thrust link 82 which is carried by pivot pin 64 at the end of lever arm 62 secured to the output rock shaft 14. The clevis 74 which is connected to the pivot pin 84 at the upper end of thrust link 82 is adapted to receive the end of the lever arm 60. In this arrangement the initial braking pressure transmitted to the clevis 74 to the pivot 84 will be amplified to some extent since the pivot point 84 is farther removed from the pivot 64 than the point at which the end 72 of the lever arm 60 bears against the cam face 80. However as the output rock shaft 14 is moved in a counter-clockwise direction for application of the wheel brakes, the thrust link 82 will slide relative to the end 72 of input lever arm 60 and the leverage action will be gradually reduced and will require a greater application of foot pressure upon the brake pedal to maintain a uniform braking action of the power brake.

I claim:

1. In combination with a power brake, an input lever arm, an output lever arm, means for producing movement of said input lever arm in a direction to apply the power brake and friction means for opposing movement of said input lever arm in a direction to apply the power brake.

2. In combination with a power brake having input and output rock shafts, an input lever arm secured to said input rock shaft, a bell crank lever pivotally carried by said input lever arm, pedal controlled means pivotally connected to one arm of said bell crank lever and friction gripping means bearing against the other arm of said bell crank lever.

3. In combination, a power brake, a casing for the power brake, input and output rock shafts supported by said casing, an input lever arm secured to said input rock shaft, a bell crank lever pivotally carried by said input lever, an arm secured to said output rock shaft, said arm having a friction face in frictional engagement with one arm of said bell crank lever, pedal controlled means connected to the other arm of said bell crank lever whereby operative movement of said output rock shaft tends to oppose the input movement of said input lever arm.

4. In combination with a power brake having input and output rock shafts, an input lever arm secured to said input rock shaft, an arm secured to said output rock shaft, a link pivotally carried by said last-mentioned arm and pedal-controlled means connected to said link for moving said link into slidable thrust engagement with said input lever arm.

5. In combination with a power brake having input and output rock shafts, said shafts being horizontally disposed in a common vertical plane, an input lever arm secured to said input rock shaft on one side of said casing, an arm secured to said output rock shaft on the same side of said casing, a pivot movable with said last-mentioned arm, a thrust transmitting link pivotally supported by the pivot on said arm and a tension-transmitting link pivotally connected to said trust link for application of the power brake through movement of the input lever arm received from the movement of said thrust link, whereby actuating movement of the output rock shaft moves the pivot for said thrust link to decrease the input pressure.

6. In a power brake construction, a power brake casing, input and output rock shafts transversely mounted in said casing, an input lever arm fixed to one end of said input rock shaft on one side of said casing, an output lever arm operatively connected to one end of said output rock shaft on the other side of said casing, means in operative engagement with said input lever arm for producing initial actuation of said input rock shaft before movement of said output rock shaft and means in operative engagement with the end of said output rock shaft opposite to the output lever end and with said first-mentioned means for producing releasing movement of said first-mentioned means upon actuating movement of said output rock shaft.

7. In a power brake construction, an input rock shaft, an output rock shaft, an input lever arm fixed to one end of said input rock shaft, an output lever operatively connected to one end of said output rock shaft, an arm fixed to the opposite end of said output rock shaft, a lever pivoted to one of said arms and in slidable thrust engagement with the other of said arms and pedal-operated means connected to said last-mentioned lever for initial actuation of said input rock shaft before movement of said output rock shaft, the actuating movement of said output rock shaft being effective to move said last-mentioned lever in a releasing direction.

EDWARD A. ROCKWELL.